United States Patent
Morgan

(10) Patent No.: US 7,100,498 B2
(45) Date of Patent: *Sep. 5, 2006

(54) CONCENTRIC BUND CAKE PAN

(76) Inventor: Fletcher Morgan, 4990 Coquina Key Dr., SE., St. Petersburg, FL (US) 33705

( * ) Notice: Subject to any disclaimer, the term of this patent is extended or adjusted under 35 U.S.C. 154(b) by 0 days.

This patent is subject to a terminal disclaimer.

(21) Appl. No.: 10/916,440

(22) Filed: Aug. 12, 2004

(65) Prior Publication Data

US 2005/0005779 A1    Jan. 13, 2005

Related U.S. Application Data

(63) Continuation-in-part of application No. 10/609,653, filed on Jul. 1, 2003, now Pat. No. 6,938,540, which is a continuation-in-part of application No. 10/424,764, filed on Apr. 29, 2003, now Pat. No. 6,789,466, which is a continuation-in-part of application No. 10/302,903, filed on Nov. 25, 2002, now Pat. No. 6,840,162.

(51) Int. Cl.
*A47J 43/18* (2006.01)

(52) U.S. Cl. .............................. 99/428; 99/439; 99/442

(58) Field of Classification Search .................. 99/428, 99/442, DIG. 15; 249/DIG. 1; D7/359, D7/672

See application file for complete search history.

(56) References Cited

U.S. PATENT DOCUMENTS

| | | | |
|---|---|---|---|
| 1,487,906 A | 3/1924 | White et al. | |
| 1,596,342 A | 8/1926 | Bassett | |
| 1,852,966 A | 4/1932 | Green | |
| 2,135,342 A | 11/1938 | Jackson | |
| 2,156,145 A | 4/1939 | Cavett et al. | |
| 2,472,620 A | 6/1949 | Rhodes et al. | |
| 2,678,143 A * | 5/1954 | Dillingham et al. | 206/509 |
| 3,141,400 A | 7/1964 | Powers | |
| 3,252,683 A * | 5/1966 | Uetzmann | 249/168 |
| 3,296,956 A | 1/1967 | Turner | |
| 3,831,507 A | 8/1974 | Wheaton | |
| 4,812,323 A | 3/1989 | Savage | |
| 5,226,352 A | 7/1993 | Savage | |
| 5,232,609 A | 8/1993 | Badinier et al. | |
| 5,514,402 A | 5/1996 | Williams | |
| 5,528,981 A | 6/1996 | Pettit | |
| 5,948,313 A | 9/1999 | Cahen | |
| 6,508,166 B1 * | 1/2003 | Hennessey | 99/355 |

* cited by examiner

*Primary Examiner*—Reginald L. Alexander
(74) *Attorney, Agent, or Firm*—John S. Hale; Gipple & Hale

(57) ABSTRACT

An apparatus assembly for forming a compound dessert in a predetermined compound ring shape including a first outer ring shaped pan defining a cavity, the cavity having a dome shaped cross section with a closed circular end, an open end and a centrally positioned funnel shaped support having an upper solid planar surface. A cover including a second dome ring shaped pan of a smaller width and depth and a surrounding circular skirt is mounted to the outer ring shaped pan with the second inner ring shaped pan extending into a cavity of the first outer ring shaped pan.

12 Claims, 5 Drawing Sheets

CONCENTRIC BUND CAKE PAN

CROSS-REFERENCE TO RELATED APPLICATIONS

This is a continuation-in-part application of U.S. patent application Ser. No. 10/609,653 filed Jul. 1, 2003 now U.S. Pat. No. 6,938,540 which is a continuation-in-part application of U.S. patent application Ser. No. 10/424,764 filed Apr. 29, 2003 now U.S. Pat. No. 6,789,466 which is in turn a continuation-in-part application of U.S. patent application Ser. No. 10/302,903 filed Nov. 25, 2002 now U.S. Pat. No. 6,840,162.

TECHNICAL FIELD OF THE INVENTION

The present invention relates generally to the field of cake baking and desert molds. More particularly, the present invention concerns a baking pan assembly for baking a concentric ring shaped bundt cake or molded dessert having nested concentrically shaped components. The present invention thus relates to an assembly for baking or molding a shaped foodstuff that can be termed a concentric bundt cake and/or combination ring shaped dessert mold.

The present invention is thus directed toward an apparatus for molding cake batter, ice creams, gelatins or other desserts into a particular ring shape with a segment of the ring having a domed cross section and an inner separate mold having a smaller concentric ring shape with a domed cross section extending into the ring cavity of the outer mold while the dessert is setting or being baked. The invention particularly concerns an assembly which molds and/or bakes concentric bundt cakes or desserts.

BACKGROUND OF THE INVENTION

Food molds are well known in the prior art. A common baking pan is a food mold, with one open end, one closed end and side walls. The closed end and side walls define a hollow cavity that becomes the three-dimensional shape of a food product molded by the baking pan.

Some food pans, such as a ring shaped baking pan for making angel food cake or a ring shaped pan for bundt cakes, have an annular hollow volume at the open end. The hollow volume is filled with a food composition and then baked. After baking, the pan is inverted to remove the shaped food composition from the open end. Thus, the open end is used to form the bottom of the final food product.

Some food molds have a centrally located indentation at the closed end. With a mold of this type, a first food composition may be placed and formed in the open end and a second food composition may be later placed in the complementary shaped indentation formed at the closed end. This provides an accurate fit for the second filler food composition within the first supporting food composition.

It can thus be seen that a number of devices have been used in the molding and baking of desserts to obtain molded desserts in a variety of configurations and for a variety of shaped configurations as described in the prior art. While cakes are commonly referred to in the literature as being domed, in effect this is an occurrence which comes about as the batter expands during baking.

Historically, it was known in the prior art to bake bread bowls which were semi-spherical loaves of bread into which a cavity was carved for placement of salads or soups. A conventional bread bowl is typically made by forming raw bread dough on the top of a simple inverted bowl which is then placed into the oven for baking. Bread bowls made in this manner often rise from the inverted bowl so that the same presents an uneven appearance, requiring trimming and waste.

Hemispherical shaped or dome cakes having dual composition are popular in Italian dessert cooking and are generally known as "Zuccotto". These cakes are prepared by slicing previously baked sponge cake (Pan di Spagna) into thin, vertical slices, lining the interior of a bowl with plastic wrap and lining the plastic wrap in the bowl with overlapping pieces of the sponge cake slices. The slices of cake are then sprinkled with liquor and the dampened assembly is then covered with a plastic wrap and refrigerated. A center mixture of chocolate or other filling is poured into the cake lined bowl and the bottom or exposed surface of the filling is covered with other slices of cake. The entire cake is allowed to set for a number of hours, preferably overnight, inverted onto a platter and dusted with confectioners sugar. As can be seen, the process for making this cake is quite laborious in time and resources required.

Many prior art devices and techniques mold and bake dough of breads, batters of cakes, cookies, and other baked goods into various shapes including containers which may be used to hold other foods. For example, U.S. Pat. No. 4,812,323, issued Mar. 14, 1989, discloses a method for molding and baking cookie dough into a cup shape which can then be used to hold ice cream or other fillings in a similar manner to U.S. Pat. No. 3,296,956, issued Jan. 10, 1967, which also discloses a molding and baking apparatus for the baking of bread dough into a cup-like shape. U.S. Pat. No. 1,487,906, issued Mar. 25, 1924, discloses a pan for baking cake batter into a container shape for holding ice cream.

In U.S. Pat. No. 3,141,400 issued Jul. 21, 1964 a telescoping cake apparatus is disclosed with a center cone assembly which moves upward when the cake batter is baked forming a frustrum conical cake with a conical center cavity. A one piece strip cross link handle is secured to the upper edge of top of the expendable baking section and the cone by staples or the like. A rotatable wire fastener is used to secure an outer bowl and inner mesh bowl for cooking shredded potatoes as is shown in U.S. Pat. No. 2,156,145 issued Apr. 25, 1939.

U.S. Pat. No. 1,487,906 issued Mar. 25, 1924 is directed toward two nesting rectangular baking pans, the inner pan having flange members adapted to sit on a shelf formed in the outer pan with the composite unit being and held in place by a strip of sheet metal which engages an upwardly extending flange of the outer pan.

U.S. Pat. No. 1,852,966 issued Apr. 5, 1932 is directed toward a baking pan used for baking a cake with a hollow center so that the same can have a filling placed therein A tapered tubular outer member has a core mold mounted thereon attached to a cover over the top of the tubular outer member.

U.S. Pat. No. 5,948,313, issued Sep. 7, 1999 is directed toward a mold assembly for making a baked edible shell. The mold assembly is constructed of an outer mold shell and an associated inner mold shell, the outer mold shell having a curved main portion with a central opening and an outer rim extending in a plane. The inner mold shell has a curved main portion with a central chimney shaped to pass through the outer mold central opening. The outer mold opening comprises a raised circular rim with an inwardly directed flange. The outer edge of the outer mold shell is formed with a rolled-up rim. When the edible material is being cooked, a metal strip with curved ends is mounted over the rolled rim of the outer shell mold as seen in FIGS. 4 and 5C to hold both mold-shells in relative positions to eliminate expansion of the edible material during cooking.

Another reference, U.S. Pat. No. 5,226,352 issued Jul. 13, 1993 is directed toward a baking assembly which has an outer dome shaped member and an inner dome shaped member as shown in FIGS. 6 and 7. A flange extends outward from the upper edge of the outer dome member to seat a flange extending from the upper edge of the inner dome member. The flanges are held together by a C clamp or other fastening means. The inner dome shaped member is TEFLON® coated on its inside surface and outside surface allowing cake or dough to be baked in the outer dome mold and the inner mold.

A baked layered product with an apparatus for making same is shown in U.S. Pat. No. 3,831,507, issued Aug. 27, 1974. This baking assembly uses three baking pans to form a cylindrical bunt body and lid which is placed over the body to hold the filling therein.

In all baking pans, it is desirable to facilitate the partial escape of moisture from these apparatuses in order to develop a degree of porosity in the final baked product. At the same time, however, the batter must absorb some moisture to prevent excessive dehydration. It therefore becomes necessary to contain the batter at a pressure sufficient to limit the extent to which water is converted to steam, since the batter absorbs steam less easily than water, while allowing for a degree of conversion and escape. The batter must also be contained to prevent the escape of the cake itself due to its expansion during baking.

The present invention also solves the complex construction problems in assembling dual bundt cake or concentric molded dessert through the use of a simple apparatus with an easy twist lock cover.

SUMMARY OF THE INVENTION

The present invention is directed toward an apparatus for simultaneously producing a dual composition bundt cake dessert or cake using an outer pan with a ring shape and dome shape cross section taken across a segment of the ring and an inner ring shaped pan with a dome shaped cross section taken across a segment of the ring which is supported in the outer pan cavity. The support is provided by a perforated cover which is fastened to the handles on the outer pan by rotating the cover handles over the outer pan handles. Both the cover assembly and the outer pan have handles extending therefrom with extending tabs allowing the same to be easily grasped and handled by the user. The combined cake sections from each of the outer and inner ring shaped pans are stacked or nested to form a dual ring shaped configuration.

It is an object of the invention to prepare two different composition food products into a single concentric bundt or ring shaped dessert presentation.

It is another object of the invention to provide a cooking assembly for baking a cake that produces a uniformly shaped bundt cake with a different internal composition of a similar but smaller shape.

It is still another object of the invention to provide a cooking assembly which delivers heat energy evenly to all areas of the cake batter being baked while covering the cake batter which has been deposited in the outer bowl.

Yet another object of the invention is to provide an apparatus that is easy to use, ruggedized and reliable.

It is a further object of the invention to mold cake batter or a dessert composition in an enclosure of a desired shape and bake or set the enclosure composition while maintaining heat at a precise desired level.

It is yet another object of the invention to provide a cooking assembly which is easily broken into individual components and is easy to clean.

Another object of the invention is to provide a cooking assembly for simultaneously baking two bundt cakes of different sizes with one cake fitting into a ring cavity formed during the baking process in the outer cake to produce a uniform cake that is predictable and reproducible without size variance.

Still another object of the invention is to provide a cooking assembly that has one or more of the characteristics discussed above but which is relatively simple to use and requires a minimum of cooking skills.

In the accompanying drawings, there is shown illustrative embodiments of the invention from which these and other objectives, novel features and advantages will be readily apparent.

These and other objects, advantages, and novel features of the present invention will become apparent when considered with the teachings contained in the detailed disclosure along with the accompanying drawings.

DETAILED DESCRIPTION OF THE INVENTION

The preferred embodiment and best mode of the invention is shown in FIGS. 1 through 8. "Batter" as used herein in the application is meant to encompass cake batter, dough, malleable ice cream, gelatin or a malleable dessert which sets up in a rigid or semi-rigid shape.

Referring to the Figures, a molding or baking assembly 20 according to the invention is adapted to shape or mold cake batter, other compositions of baking goods or complimentary desserts such as ice cream, gelatins, puddings into a concentric dual bundt cake shape.

Figure 2:
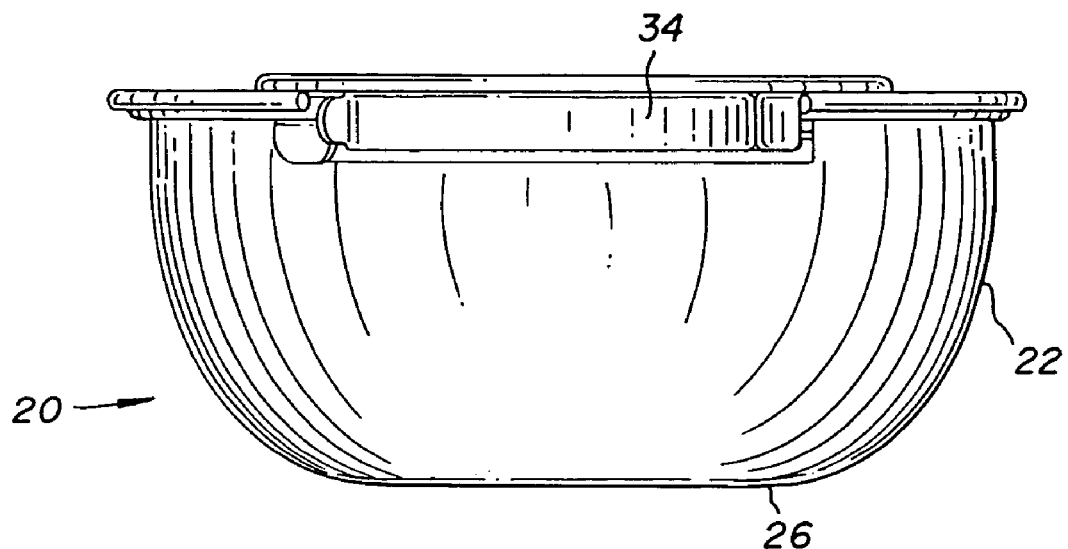
FIG. 2 is a side elevational view of the concentric bundt mold assembly shown in FIG. 1.
Figure 3:
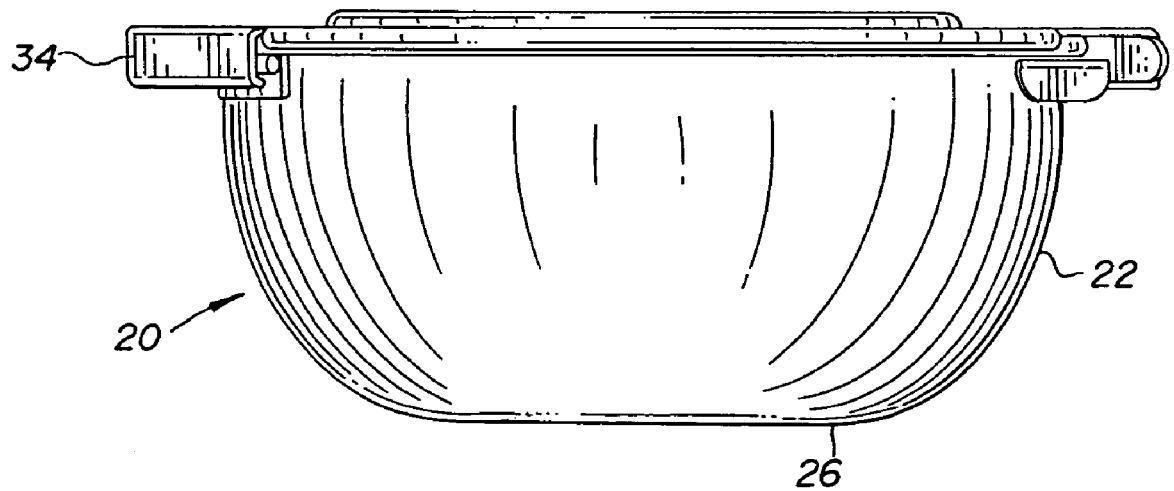
FIG. 3 is a front elevational view of the concentric bundt mold assembly shown in FIG. 1.

The outer pan 22 is typically symmetrical with a ring shape and a domed cross section taken across one segment of the ring. The outer pan is constructed with a ring shaped body 24 having a domed or curved closed bottom 26, and side walls 27 and 28 forming an interior chamber or cavity 29 with an open end 30. The side wall 28 forms an interior reverse funnel shaped or cone structure 31 with a circular shaped solid planar surface 33. The open end 30 is formed with a curved or rolled outer lip or rim 32 as shown in FIG. 2 and has two handles 34 secured to the exterior of the sides the outer pan surface under the rim 32 extending outward from the rim or outer circumference of the pan opposite each other. Each handle 34 has a downwardly turned tab member 36, each tab member being located on different ends of the respective handles. The outer lip 32 is curved in a bead or circular configuration and preferably has a diameter of about 0.25 inches and sits inside of rim 63 of the inner pan cover assembly.

While the ring body provides a suitable seat for baking, if desired, a base support member (not shown) may be secured to the bottom surface 26 of the ring body 24 to provide a flat base source during working and/or cooking. The base support member is preferably constructed of 22 gage C1018 cold rolled steel with ring shape having a bell shaped exterior surface having a side wall with a curved bottom edge forming a planar plane which seats the outer pan. The base support member is secured to the base section of the ring shaped body 24 by welding or braising.

If desired, a bimetallic thermometer can be attached to the base support member which thermometer would turn an appropriate color upon reaching the desired cooking temperature allowing the cook to ascertain that the desired temperature has been reached.

The outer pan body 24 and optional base support member is preferably integrally constructed of sheet steel or stainless steel but can be constructed of copper, aluminum, cast iron, pyrex, glass, porcelain, ceramic or any type of microwaveable material at a uniform desired thickness commonly used for baking pans and containers. If desired, the outer ring pan body can have its external surface coated with a non-corroding material such as tin or chromium. The outer ring pan body 24 therefore may be constructed of a single sheet of metal formed into the desired shape. The inside surface of the ring cavity 29 is preferably coated with one or more nonstick coatings, as for example TEFLON® (i.e., fluorocarbon polymers), (e.g., tetrafluroethylene and fluorinated ethylene propylene). The interior surface of the outer pan 24, which contacts the batter or dessert composition, is covered with TEFLON® in the preferred embodiment to ease the removal of the baked or chilled product from the bowl. The radial sloping of the inner surfaces further eases removal of the final dessert composition. It will be appreciated by those skilled in the art that other shapes and geometries of pan assemblies are possible, and that the specifics of material of which it is made can be changed without departing from scope of the invention. The mold may be formed or stamped from a solid piece of material or spun from aluminum instead of formed from a sheet.

Figure 1:
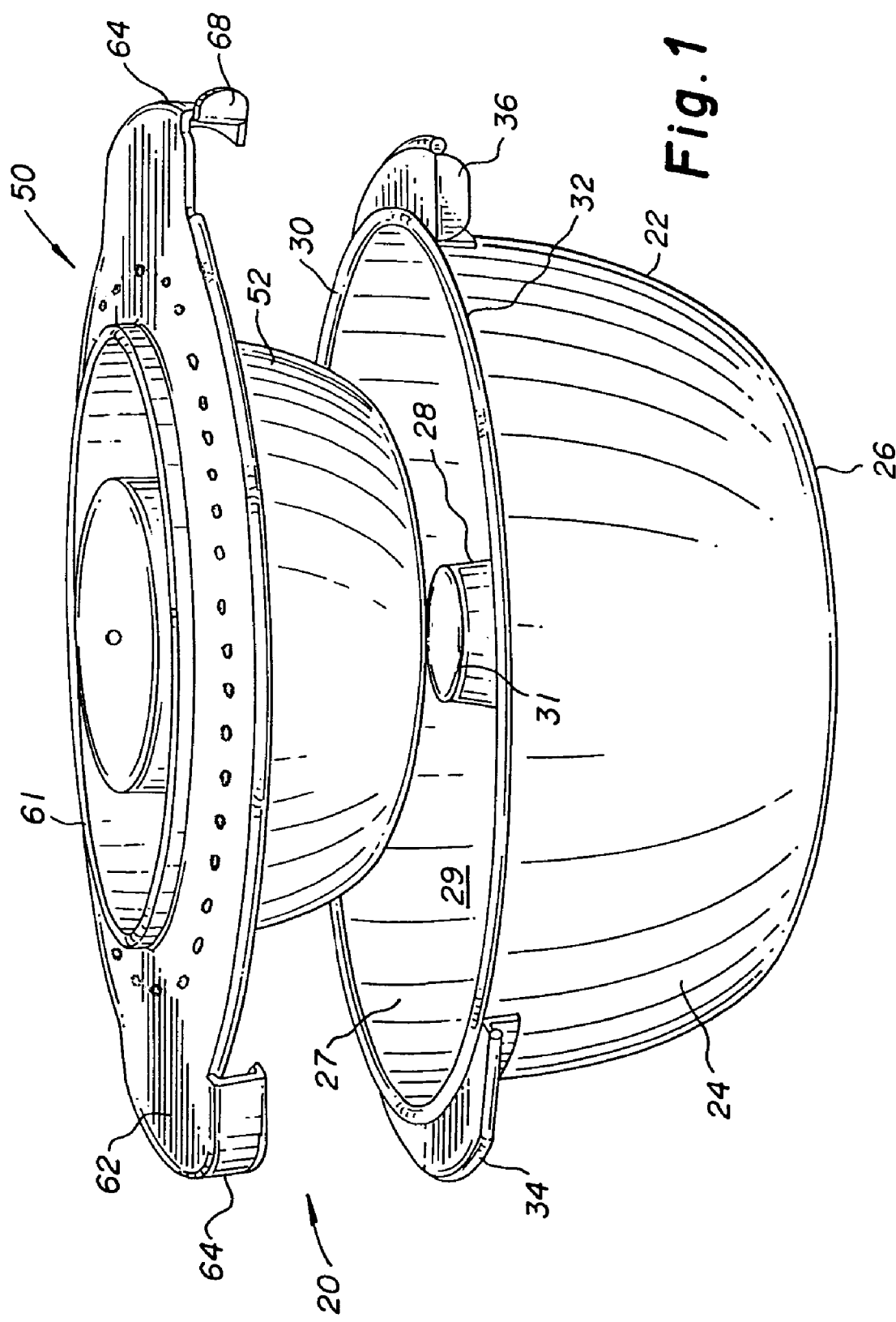
FIG. 1 is a perspective exploded view of the dual concentric bundt mold assembly of the present invention.
Figure 4:
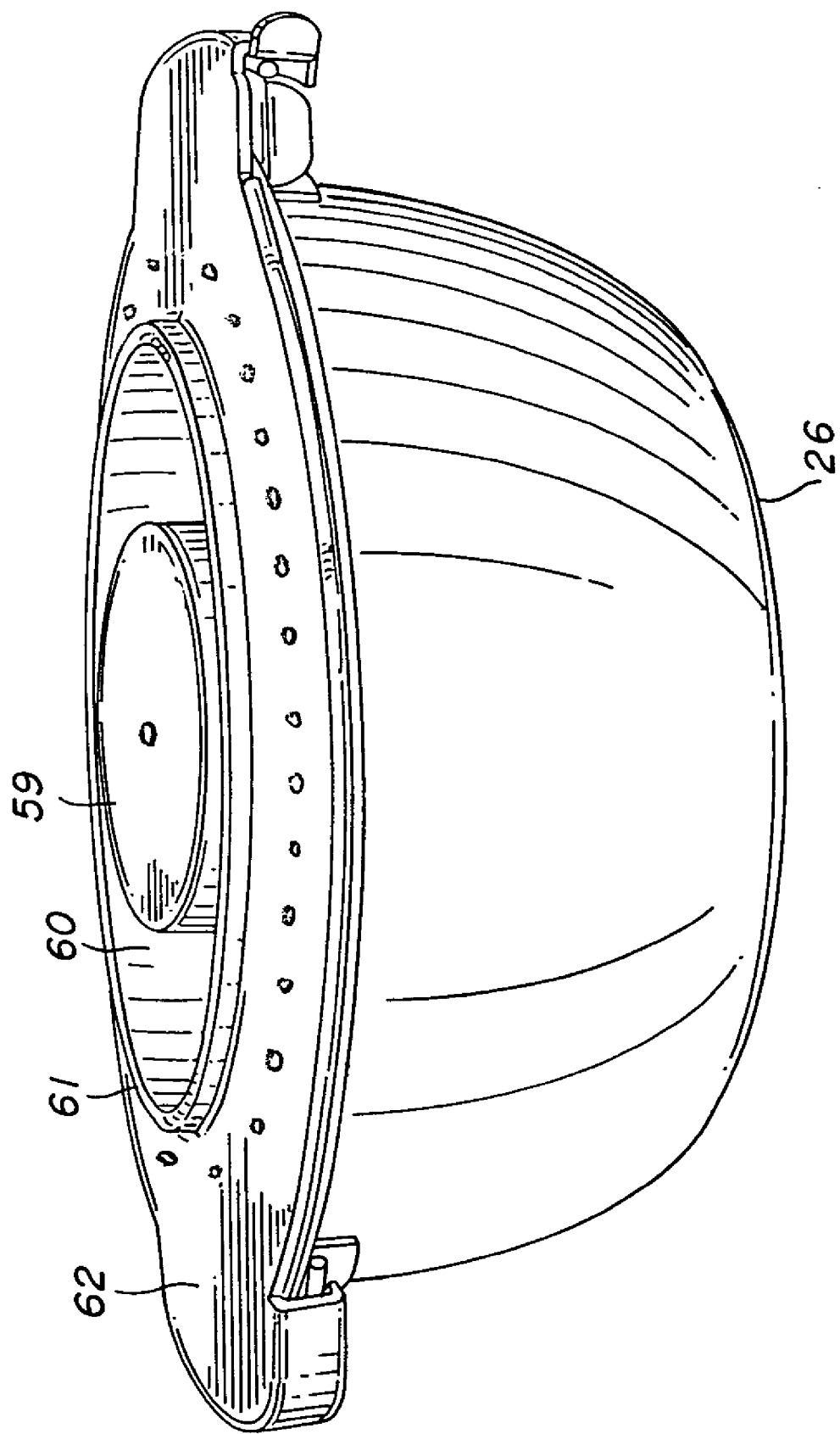
FIG. 4 is a perspective view of the assembled dual concentric bundt mold assembly of FIG. 1.
Figure 7:
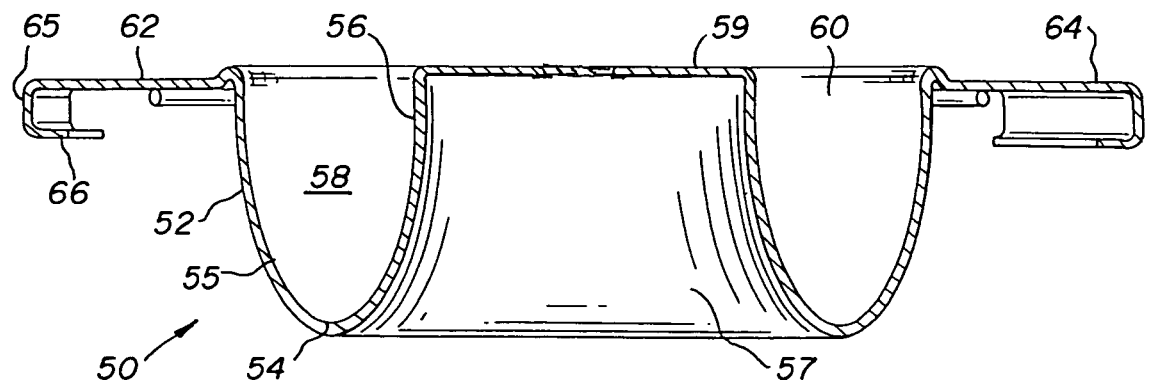
FIG. 7 is a cross sectional view of the inner dome pan component.
Figure 8:
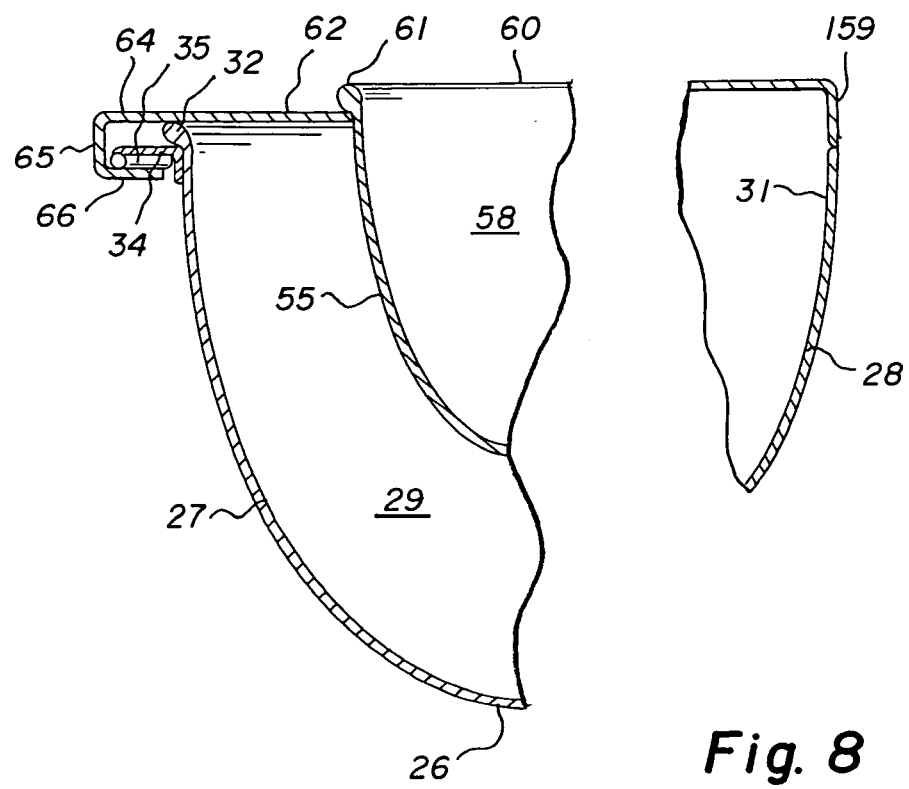
FIG. 8 is an enlarged partial cross sectional view of the cover, inner pan component and outer pan component in a locked position.

A cover assembly 50 has an integral ring shaped pan 52 as shown in FIGS. 1 and 7. The inner pan 52 is typically ring shaped with a segment of the ring having a dome shaped cross section. The inner pan is constructed with a curved closed bottom surface 54 and has side walls 55 and 56 forming a ring shaped cavity or chamber 58 leading to an open end 60. A lip 61 extends above the plane of a cover skirt 62 and defines the exterior area of cavity 58. The cover skirt 62 extends outward from the lip 61 and has a planar surface. The ring body 52 has a smaller width and depth so that it will be seated in cavity 29 of the outer ring pan 24. The cover assembly 50 is substantially circular or of a ring shape with handles 64 opposing each other. The handles 64 are shaped to fit over the outer pan handles 34 as shown in FIGS. 4, 7 and 8 and a lower downwardly extending rim 65 which sits just outside of outer lip 32 of the outer pan when the components are locked together. The skirt 62 between the lip 61 and rim 65 is planar and forms a concentric circular area which covers the cavity 29 and open end 30 of the outer pan ring pan 24. The handles 64 are rolled or bent in a "C" configuration to hold the outer pan handles 34 so that the bottom portion 66 of the handles fits under the lower surface of handles 34 of the outer pan and when rotated, locks the outer pan and cover assembly 50 in a fixed position as shown in FIG. 8. One end of each handle 64 is provided with an outwardly extending tab 68 which allows the handle to be easily rotated on the handle 34 and removed. The inner side wall 56 forms an internal center support structure 57 which fits over the inner structure 31 formed by side 28. The center support structure 57 has a upper circular planar surface 59 which is positioned above the funnel or cone shaped structure 31. The planar surface 59 has a central aperture 159 formed therein The aperture 159 preferably ranges from about 2 mm to about 4 mm in diameter and most preferably is about 3 mm in diameter. This aperture allows air to escape from the space between the inner side of the cover assembly and the center core 31 of the outer pan 22.

Figure 5:
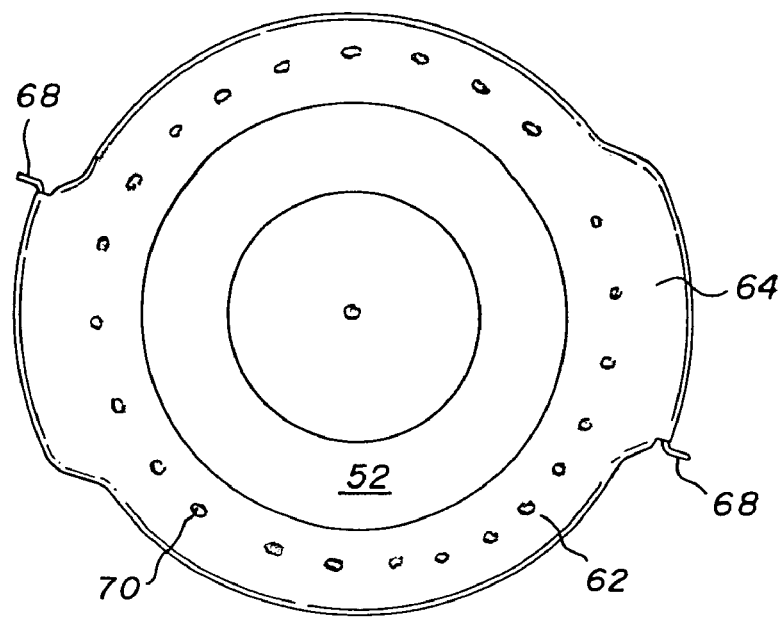
FIG. 5 is a top plan view of the cover and inner pan component shown in FIG. 1.
Figure 6:
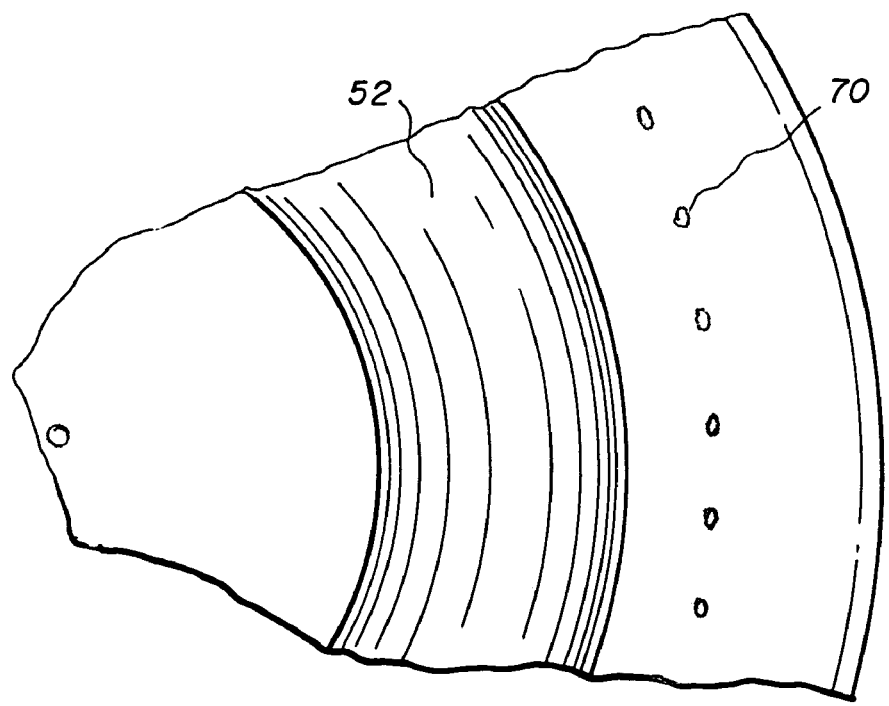
FIG. 6 is an enlarged partial plan view of the cover and inner pan of FIG. 1.

Preferably the planar cover area or skirt 62 is provided with a number of through going holes 70 as shown in FIGS. 1, 5 and 6 which allow steam to escape from the batter in the outer pan 22 while it is cooking.

Alternatively, the cover assembly 50 and inner ring pan 52 can be constructed of porous material such as high temperature TEFLON coated high temperature fiberglass ranging from 5 to 10 mils in thickness or a stainless steel wire cloth also TEFLON coated on both sides, both of which are breathable and allow an air flow of 50 CFM which vents moisture during baking without batter coming through. The porous material has a sieve opening for the stainless steel wire cloth ranging from 0.0165+ or −0.0005 and the stainless steel is STME 1187. The inside and outside surfaces of the inner ring pan 52 are preferably coated with one or more nonstick coatings, such as for example TEFLON® (i.e., fluorocarbon polymers), (e.g., tetrafluroethylene and fluorinated ethylene propylene). Alternately the bowl body can be constructed of sheet steel, stainless steel, copper, aluminum, cast iron, pyrex, glass, porcelain, ceramic or any type of microwaveable material at a uniform desired thickness commonly used for baking pans and containers.

The interior and exterior surfaces of the inner pan 52, which contacts the batter or dessert composition is smooth and is preferably covered with TEFLON® in the preferred embodiment to ease the removal of the baked or chilled product from the bowl. The radial sloping of the inner walls further eases removal of the final dessert composition. It will be appreciated by those skilled in the art that other shapes and geometries of pan assemblies are possible, and that the specifics of material of which it is made can be changed without departing from scope of the invention.

The inner pan 52 is mounted in the ring shaped outer pan cavity 29 by placing the cover assembly 50 on the rim 32 so that the handles 64 are offset from the outer bowl handles 34 is adjacent rim 32. The cover assembly 50 is then rotated by applying force to tabs 68 so that the ends 65 of the handles 64 engage the outer ring pan handles 34 with the bottom portion 66 of the cover assembly handles being positioned under the bottom surface of outer pan handles 34 engaging a downwardly projecting handle rim support 35 as shown in FIG. 8.

In operation cake batter is poured, about ⅔ to ¾ full, in the pan cavity 24 up to the embossed guide line or lines and the cover assembly 50 and its integral inner ring shaped pan 52 is placed in chamber or cavity 29 of the outer pan 22 and the cover rotated so that both handles are aligned and locked.

A second cake batter of a different flavor as for example, chocolate, is poured in the cavity 58 of pan 52 about ⅔ to ¾ of the depth of the cavity.

After the batter is molded and baked by the application of heat to the pans, with steam being conveyed by the holes 70 and aperture 159, the cover assembly 50 is removed and the inner ring pan 52 is taken out of its nesting position cavity 29 in the outer pan 24 leaving a cavity in the cake or mold. The TEFLON® coating of the interior and exterior surface of the cover assembly 50 and inner ring pan 52 facilitates removal of the mold without tearing or damaging the final baked product. The baked cake is then removed from the inner ring pan 52, the TEFLON® coating of the interior surface of the cavity of the inner pan facilitating the dessert removal. The result is a baked goods, which has concentric ring shaped portions, preferably of different flavors and/or composition and is ready to eat. The TEFLON® coating of the interior surface of the outer pan mold 24 facilitates removal of the baked product without tearing or damaging the final baked product. The interior cake or other optional filling is placed in the cavity formed by inner ring pan 52 and the composite assembly is inverted onto a serving area for frosting, icing or other decoration preparatory to being served. The result is a dual composition bundt cake or dessert which is ring shaped and ready to eat. The baked goods or molded foodstuffs may be filled or coated with ice cream, pudding, icing or other sweet filling for a dessert pastry.

Although aluminum, sheet steel and/or stainless steel is preferred for the outer pan body, any suitable structural material could be used in its place, as for example, alloyed steel, copper, brass, cast iron or even glass or ceramic, such as stoneware. The inner bowl body has the same structural body as that of the outer pan body.

The principles, preferred embodiments and modes of operation of the present invention have been described in the foregoing specification. However; the invention should not be construed as limited to the particular embodiments which have been described above. Instead, the embodiments described here should be regarded as illustrative rather than restrictive. Variations and changes may be made by others without departing from the scope of the present inventions defined by the following claims.

What is claimed is:

1. An apparatus assembly for forming a compound dessert in a predetermined shape comprising:
   a first outer pan comprising a ring shaped pan with an exterior side wall, a bottom integral with said side wall and an interior central truncated funnel shaped member extending upward from said bottom with a solid upper planar end surface, said ring shaped pan having its bottom closed and top open to define a ring shaped cavity, handles mounted to said first outer pan and extending outward from said pan; and
   a cover assembly comprising a closure member with a planar support member defining a second inner ring shaped pan with a closed end, side walls and an open end of lesser width then the width of said first outer pan ring shaped cavity, said planar support member being provided with handles which are removably mounted to said first outer pan handles to allow the first outer pan and cover assembly to be selectively secured together, said planar support member defining a plurality of throughgoing apertures.

2. An apparatus assembly as claimed in claim 1 wherein non-stick material is coated on said outer pan and said cover assembly.

3. An apparatus assembly as claimed in claim 2 for forming a compound dessert in a predetermined shape wherein said nonstick material is tetrafluroethlene.

4. An apparatus assembly as claimed in claim 2 for forming a compound dessert in a predetermined shape wherein said nonstick material is fluorinated ethylene propylene.

5. An apparatus assembly as claimed in claim 1 for forming a compound dessert including a support base secured to said ring shaped pan.

6. An apparatus assembly as claimed in claim 1 wherein non-stick material is coated on all surfaces of said outer pan and said cover assembly.

7. An apparatus for forming a foodstuff in a predetermined shape comprising:
   a first ring shaped outer pan having a lip extending around its outer circumference, handles mounted on an exterior surface of said outer pan, said ring shaped outer pan defining a central cone shaped support structure with a solid upper planar surface;
   a cover assembly mounted to said ring shaped outer pan, said cover assembly comprising a second ring shaped inner pan with an upraised central portion which is adapted to be mounted in said outer pan with the upper surface of said central cone shaped support structure being a solid planar surface which is positioned adjacent a lower surface of said upraised central portion, a skirt member extending from the circumference of said inner ring shaped pan, said first and second ring shaped pans being mounted together in a nesting relationship, said skirt member defining a plurality of throughgoing holes therein which are positioned over a cavity formed in said first ring shaped pan;
   said upraised central portion having an aperture therein to allow air to escape from the space between the inner side of the inner pan and the central cone structure of the outer pan; and
   opposing handles mounted on said skirt member, each of said handles defining a curved flange which engages a bottom surface of said outer pan handle to hold the same in a fixed position.

8. An apparatus as claimed in claim 7 wherein said outer pan has batter fill indicia embossed on the side walls thereof.

9. An apparatus as claimed in claim 7 wherein said inner pan upraised central portion defines an aperture which ranges in size from about 2 mm to about 4 mm in diameter.

10. An apparatus as claimed in claim 9 wherein said aperture is about 3 mm in diameter.

11. An apparatus assembly as claimed in claim 7 wherein non-stick material is coated on said outer pan and said cover assembly.

12. An apparatus assembly as claimed in claim 7 wherein non-stick material is coated on all surfaces of said outer pan and said cover assembly.

* * * * *